Patented Sept. 29, 1942

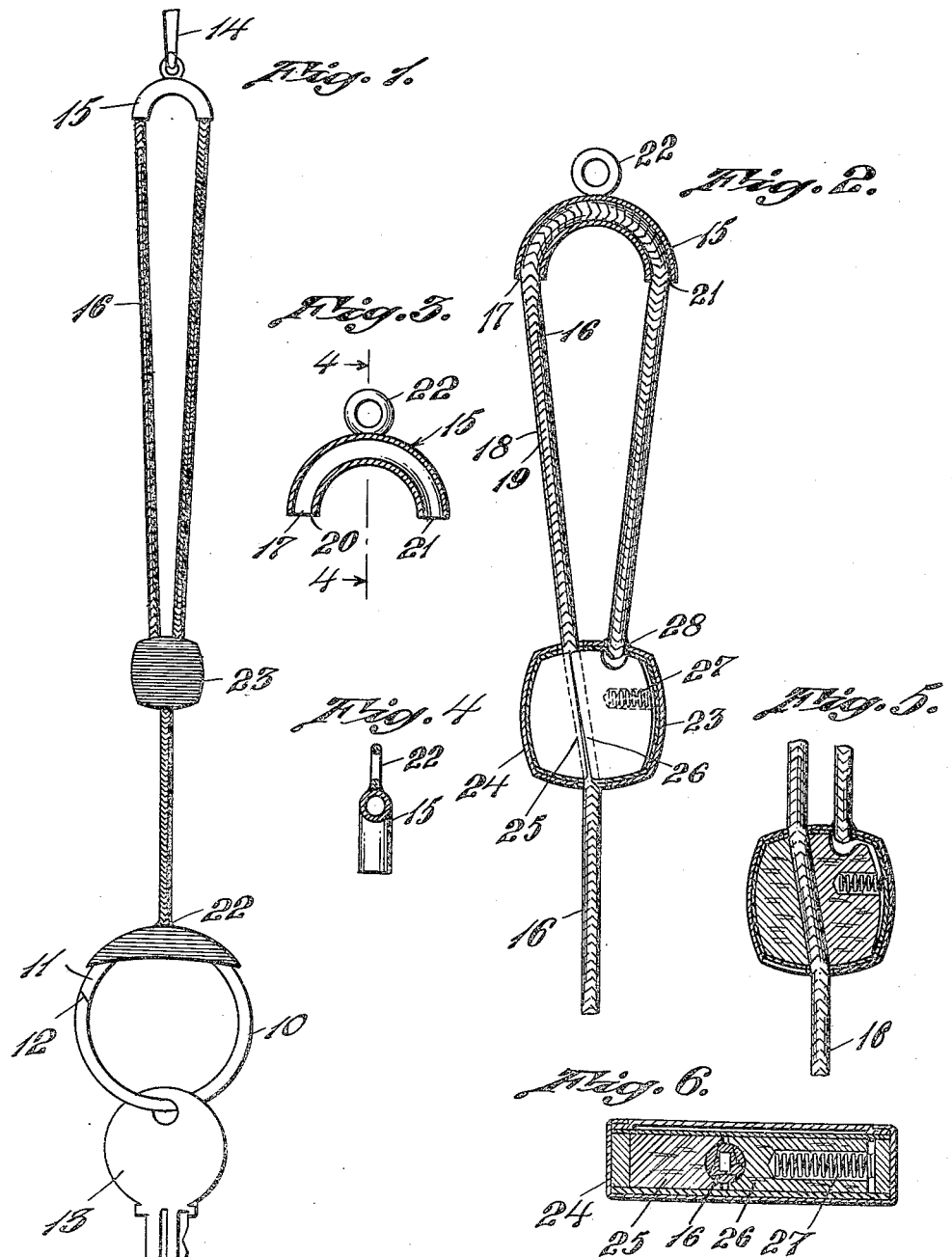

2,297,661

UNITED STATES PATENT OFFICE 2,297,661

CHAIN SLIDE

Nathaniel N. Okun, Bronx, N. Y., assignor to Swank Products, Inc., a corporation of Delaware Application May 19, 1939, Serial No. 274,503

2 Claims. (Cl. 59—93)

This invention relates to a slide for a flexible member such, for instance, as that used in connection with the attachment of a key ring to a garment and has for one of its objects to provide an easier gliding movement of the member when in looped arrangement.

Another object of the invention is to provide a guide in connection with a flexible element which has a limit of flexing so that undue strain on the element will not be had, causing a breaking of the element.

A more specific object of the invention is to provide a guide for a snake chain which cannot be flexed about a small or short arc, without breaking, and yet which chain is very soft and desirable in connection with a key chain where sliding movement for extension is to be had.

With these and other objects in view, the invention consists of certain novel features of construction, as will be more fully described, and particularly pointed out in the appended claims.

In the accompanying drawing:

Fig. 1 is an elevation illustrating a key chain equipped with my invention.

Fig. 2 is a view on a larger scale illustrating the friction unit of the chain in section and also the slide which is the subject of this invention in section.

Fig. 3 is a sectional view of the slide alone.

Fig. 4 is a section on line 4—4 of Fig. 3.

Fig. 5 is a sectional view of the friction unit with the chain in position.

Fig. 6 is a sectional view thru the spring of the friction unit.

In the use of a chain or other flexible member for attachment of an article to wearing apparel, such as a key chain, it is often desirable to use a member which has some limited flexibility. Such a flexible member if bent about too short an arc is liable to be broken and in order to avoid this undesirable occurrence, I have provided a guide for a chain or such element which will so determine the arc about which it is flexed that freedom of movement is always afforded, and the following is a more detailed description of the present embodiment of this invention, illustrating the preferred means by which these advantageous results may be accomplished.

With reference to the drawing, 10 designated an article holding element such as a key ring which may be opened for the reception of a key 13 by means of latch 11 which completes the ring at the junction 12. Element 14 is provided for attachment to the edge of the trousers or belt worn upon the trousers or to a trouser loop or some desirable part of a garment, and I have provided a slide 15 attached to this element thru which the flexible member 16 is slidably guided.

This flexible element 16 is of a character which has limited flexibility. It is here shown as a snake chain which will bend upon the arc of a circle of approximately ¼ inch radius without rupturing, altho this particular dimension is given only for illustrative purposes. If it is attempted to bend the chain about an arc of a circle of less radius, the chain may be ruptured and further will not easily slide, friction occurring both in the chain and on the part along which it is intended to be moved. Accordingly, I have provided the slide 15 having a channel 17 on an arc having a radius at least as great as the radius of free flexing of the chain so that when the chain 16 is guided thru this channel 17 it will not be subjected to a severe bending and less than its limit of bending so that it will slide freely and the different articulate portions 18 and 19 of the chain will not be strained or ruptured. The slide 15 is semicircular in form so that the openings 20 and 21 will both be in the same direction whereby an effective reversal of direction of movement of the chain is accomplished. A ring 22 or other suspending hanger may be secured to the slide 15 for convenient attachment to the element 14.

The flexed chain 16 extends from a point 22 on the key ring thru a friction element 23 having a casing 24 and jaws 25 and 26 forced one toward the other by spring 27 which provides a grip on the member 16 as it passed thru the unit, this member then continuing thru the slide 15 and returning to the friction element where it is secured as at 28. It will be apparent that if the key chain is to be extended it is merely necessary to pull upon the key ring and the friction unit will slide on the flexible member 16 toward the attaching element 14, the chain sliding thru the slide 15 whereas if it is desired that a contraction of the flexible connection take place, it is merely necessary to grasp the friction element 23 and move it toward the key ring 10 so as to cause the flexible member to slide in the other direction thru the slide 15 and contract the effective connection between these two elements 10 and 14.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a device for personal wear, for adjustably attaching an article to the clothing of the user, in combination with a flexible metal link chain symmetrical with reference to its longitudinal center and having limits of flexibility, a slide providing a tubular bore curved to an extent to obtain reverse of direction of a chain passing therethrough and of a size to closely fit and confine the chain within the walls of the bore and having a curvature on the arc of a radius at least as great as the limit of flexibility of said member and a unit to which both ends of the chain lead from said slide to points more closely spaced than the ends of said slide, one end of the chain passing through the unit and slidably related thereto, whereby the direction of movement of the chain through the member is reversed and an article carried by one end of the chain may be adjusted as to its distance from the slide by sliding movement of the chain through said bore.

2. In a device for personal wear, for adjustably attaching an article to the clothing of the user, in combination with a flexible metal link chain symmetrical with reference to its longitudinal center and having limits of flexibility, a slide providing a substantially semi-circular curved tubular bore of a size to closely fit and confine the chain within the walls of the bore and having a curvature on an arc of a radius at least as great as the limit of flexibility of said member and a unit to which both ends of the chain lead from said slide to points more closely spaced than the ends of said slide, one end of the chain passing through the unit and slidably related thereto, whereby the direction of movement of the chain through the member is reversed and an article carried by one end of the chain may be adjusted as to its distance from the slide by sliding movement of the chain through said bore, and means located at the middle of the convex side of the slide for attachment to a supporting member.

NATHANIEL N. OKUN.